UNITED STATES PATENT OFFICE.

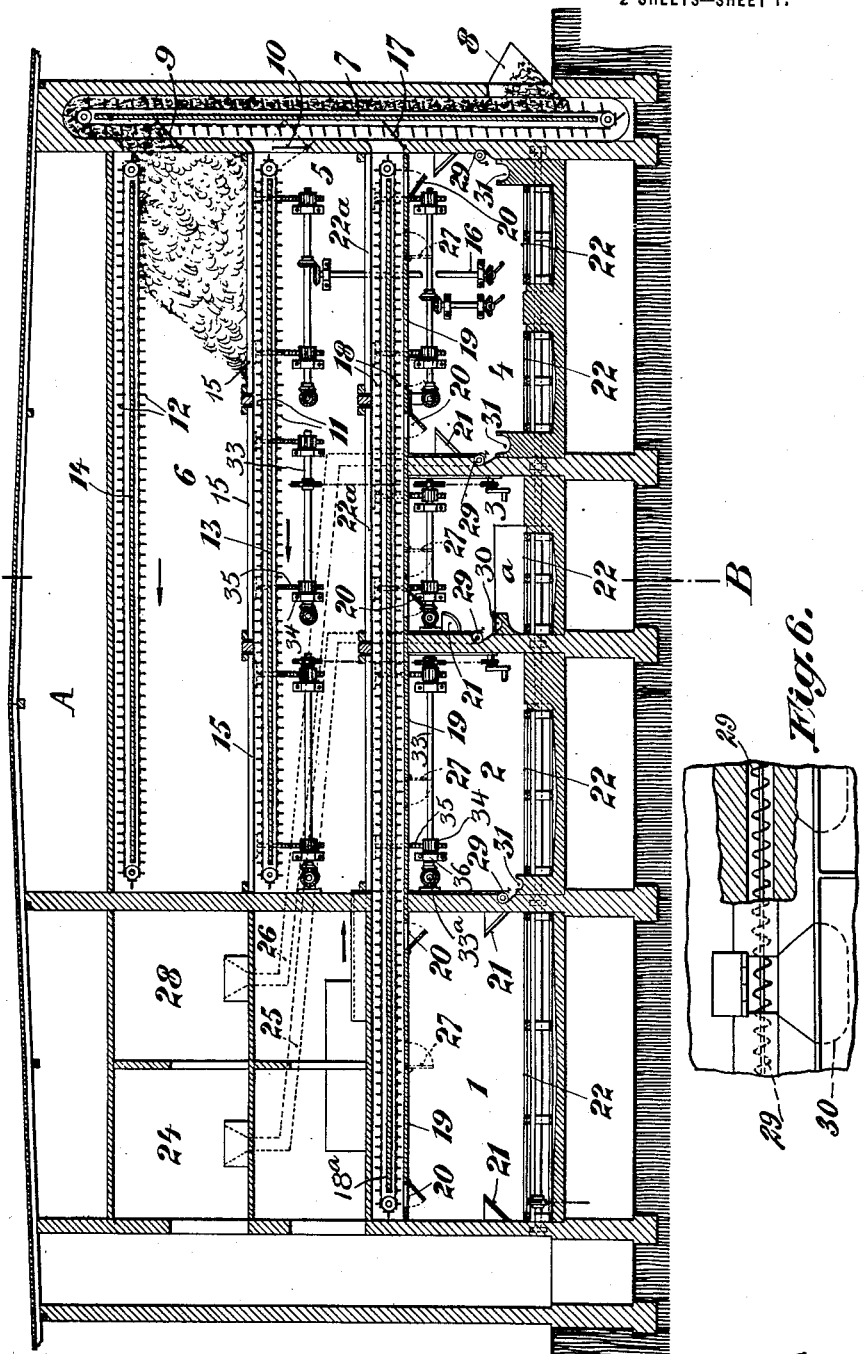

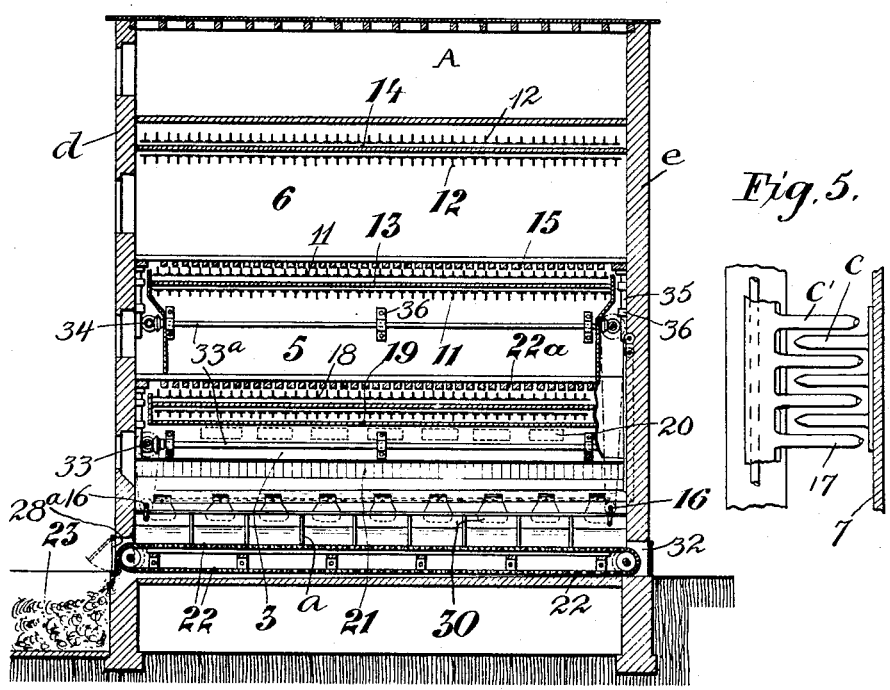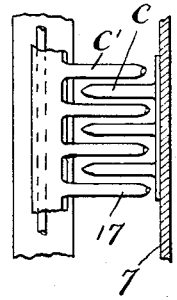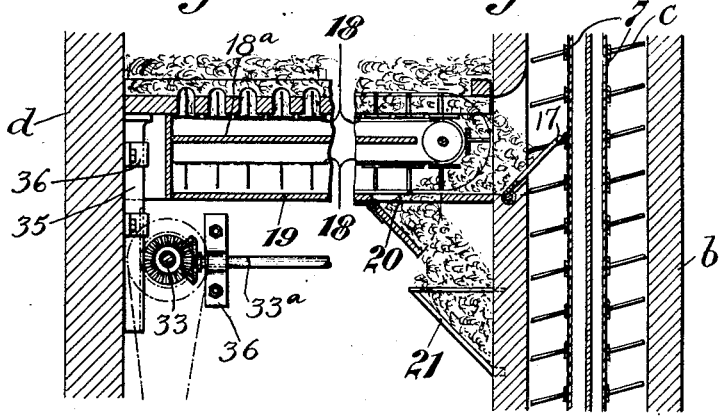

ALBERT SCHUCHARDT, OF SOEMMERDA, GERMANY.

CATTLE-STABLE PLANT.

1,186,444.  Specification of Letters Patent.  Patented June 6, 1916.

Application filed May 13, 1915. Serial No. 27,941.

*To all whom it may concern:*

Be it known that I, ALBERT SCHUCHARDT, a subject of the German Emperor, residing at Soemmerda, Kingdom of Prussia, Germany, have invented certain new and useful Improvements in Cattle-Stable Plants, of which the following is a specification.

The present invention has for its object the creation of a stable plant, in which human labor is dispensed with as far as possible. Especially the gathering of fodder and litters and the distribution of these materials among the store-rooms and their delivery to the single sheds, and finally the removal of the manure, which is to be effected in a mechanical way.

The invention essentially consists in conveyer belts, provided with grippers, and arranged in such a manner that they lie with their top run above the ceiling and with their bottom run below the same. The run of the belts lying below the ceiling serves for distributing the fodder or litters (straw, hay or the like) gathered, by a lift, in the room situated below the run, whereas the run of the belt situated above the ceiling serves for the removal of the fodder stored in the room above the same. Above the top run of the belts grates, lying in the direction of the progress of the belt, are adjustably arranged in such a manner, that in their elevated position they keep the material heaped upon them away from the reach of the grippers of the conveyer belts, whereas in their lowered position they come so to lie between the grippers of the conveyer belts that said grippers catch part of the material. Below the bottom run, situated above the feed-racks, of the lower conveyer belt a bottom with traps is provided, a convenient distribution of the fodder among the different stands thereby being insured. Furthermore, according to the present invention, the floor of the cattle-stands is formed by endless conveyer belts having the shape of grates, by the progress of which the manure lying on the grate is removed from the stable.

In the drawing an embodiment of the invention is shown, in which—

Figure 1 shows a longitudinal section through the whole plant, Fig. 2 shows a cross-section on the line B—B of Fig. 1, and Figs. 3 and 4 show, on an enlarged scale, details of the plant in a cross-section and a longitudinal section respectively.

Referring particularly to the drawings, A denotes a stable structure constructed in accordance with the invention, having the stable rooms 1, 2, 3 and 4 preferably arranged on the ground floor of the structure and out-fitted according to the kind of cattle to be lodged in them; for instance, room 1 serving for sheep, room 2 for swine, room 3 for horses, and, finally, room 4 for cows. All of the stable rooms 1, 2, 3 and 4 may be suitably sub-divided into stalls; however, the present showing only illustrates room 3 as being divided into stalls by the partitions $a$. Arranged above the rooms 2, 3 and 4 are the garrets or store rooms 5 and 6, which latter are arranged one above the other and provided for the storing of hay, straw, fodder, and the like. An end wall $b$ has housed therein an endless conveyer or elevator 7, adapted to receive and convey feed from the hopper 8, disposed in the lower portion of the end wall $b$, to the store rooms 5 and 6. Said wall $b$ is also formed on its inner side near the ceiling of the rooms 5 and 6 with the feed traps or chutes 9 and 10, which, when so positioned, receive the feed from the conveyer 7 and discharge the same into the store rooms 5 and 6. The chutes 9 and 10 may be opened and closed, at will, to independently control the supply of feed into the store rooms 5 and 6, it being understood that feed of various kinds, such as hay, straw, fodder, and the like, are to be stored in the store rooms 5 and 6. The conveyer 7 consists of an endless belt, as shown in the drawings, having transversely arranged thereupon a plurality of rows of substantially parallel fingers $c$. The traps 9 and 10 consist of a plate hinged or otherwise suitably pivoted in the framework of the stable structure and being provided with a plurality of toothed projections $c'$ which are adapted to have the projections $c$ of the conveyer pass therebetween.

To prevent the material stored in the store rooms for accumulating at one end thereof or about the traps 9 and 10, the endless conveyer belts 11 and 12, of the same construction as the conveyer 7 are disposed in the upper portion of the rooms 5 and 6, preferably suspended from the ceiling thereof. The conveyer belts extend horizontally across said rooms and travel in the direction of the arrows shown in Fig. 1. Co-extensive with the conveyer belts 11 and 12 and interposed in the loop formed thereby are the supporting plates or partitions 13 and 14, respectively, as shown in Figs. 1 and 2. It will thus be seen that the bottom runs of the belts 11 and 12 will distribute the feed discharged into the rooms 5 and 6 through the traps 9 and 10 to all portions of said rooms. Between the ceiling 19 of the stable rooms 1, 2, 3 and 4 and the floor of the store room 5, there is arranged a conveyer 18, of the same construction as the conveyer belts above mentioned and traveling in the same direction of progress. Interposed between the loop or runs of the endless conveyer 18 is a partition member 18ª of the same construction and for the same purpose as the partitions 13 and 14, above described.

The stable rooms 1, 3 and 4 have their stalls equipped with the feed or hay racks 21 suitably secured to the walls of the rooms and adapted to receive feed from the trap discharge openings 20 provided in the ceiling 19, it being understood that the bottom run of the conveyer 18 moves the straw or hay over the ceiling 19 which forms a floor for the conveyer 18. The traps 20 are hinged, as shown, and may be opened and closed, at will, to supply feed material to a single or a plurality of feed racks 21, as desired.

The floors of the rooms 5 and 6 are formed with a plurality of traps or openings, which are covered by gratings 22ª and 15, respectively. Said gratings consist of a plurality of spaced bars lying above the projecting fingers $c$ of the conveyer belts 18 and 11, respectively and in the direction of progress of the latter. Windlasses 16 are provided for the gratings 15 and 22ª and are adapted to raise and lower the latter with respect to the top run of the conveyer belts 11 and 18 so as to control the supply of the feed resting upon said grates to the top runs of said conveyer belts, it being understood that the projecting fingers $c$ of said belts will extend through the openings in said gratings, and thus catch and carry off the feed toward the end wall $b$ of the stable. Assuming, for instance, that hay is stored in the room 5 and fodder is stored in the room 6, and it being desired to supply the stable room 4 with fodder, the trap 9 will be closed and the trap 10 will be moved to a position shown in dotted lines, so that the fodder collected by the projecting fingers $c$ of the conveyer belt 11 would be discharged through the chute or trap 10 to the conveyer 7, and thence to the trap 17 to be distributed by the distributing belt 18. The belt 18 will then act upon the feed material discharged through the trap 17 and move the same along the floor 19 to the trap openings 20 of the stable room 4, and from thence the feed material is discharged into the feed bins 21. If it is found desirable to distribute fodder to any of the other stable rooms their respective trap openings 20 may be opened, otherwise the material being distributed by the belt 18 and which is not discharged through the trap openings 20 of the room 4 at once will travel with the belt 18 until the same has been all discharged into the feed racks 21 of the room 4.

When the above distribution of fodder is being made, it is to be understood that the gratings 22ª of the room 5 are raised by their windlasses to a sufficient height as to avoid contact with the conveyer 18, thereby preventing the feed material resting thereupon from being withdrawn from the room 5 by the projecting fingers $c$ of said belt. The windlasses 16 are adapted to operate, through a flexible connection, a shaft 33 suitably supported by brackets 36 to the walls of the stable structure. The shafts 33ª are arranged on opposite side walls of the stable and are connected by a transverse power transmitting shaft 33 as shown in the drawings. The shafts 33 have mounted thereon spur gears 34 adapted to mesh with the racks 35 secured to the grates 22ª. Each grate 22ª is independently operated by a mechanism just described, and it will also be seen from the drawings that the grates 15 are operated by similar mechanism. When it is desired to distribute the feed material stored in the chamber 5, a similar operation takes place after the trap 10 has been moved into closed position, and the grates 22ª have been lowered to have the projecting fingers $c$ of the top run of the conveyer 18 extend therethrough. The conveyer floor 19 is further provided with the trap openings 27 for discharging the feed material of the room 5 to the stable rooms 1, 2, 3 and 4. A suitable number of trap openings 27 are provided to permit the feed material to be distributed to a single stall, if desired. The store rooms 24 and 28 are disposed in the opposite end of the stable structure and are adapted to contain, for storage, feed material of a granular or pulpy character, such as oats, corn, and the like, which is supplied to the rooms 2, 3 and 4 through the pipes 25 and 26. Troughs are suitably arranged in the stable rooms and extend transversely across the stalls thereof, while room 3 has individual troughs 30, as shown. Supported in a mortise in the partition walls of said stable rooms is a screw conveyer 29 having communication with the pipes 25 and 26 and adapted to discharge and distribute the feed material to the feed troughs 30 and 31, respectively.

The floors of the stalls of each stable room consist of an endless conveyer 22 of any suitable or approved construction. The side walls $d$ and $e$ of the stable A are formed at their lower portion adjacent the ends of the conveyer 22 with the covered openings 32. It will thus be seen that as the conveyers 22 are actuated, the excrement and waste substances are discharged through an opening 28ª into the pit 23 suitably arranged and disposed adjacent the side walls of the stable structure A.

From the above, it will be obvious that the stables are self-cleaning, and that by a certain manipulation of the various parts above described, the feed may be automatically distributed to the stalls of the various stable rooms, it being also understood that the invention consists in the novel construction, combination and arrangement of parts above described, and finally pointed out in the appended claims.

The entire system above described may be operated by electric motors, or similar engines, not shown, but which are suitably geared to the actuating parts of the system and which can be automatically operated at certain predetermined hours of the day by time switches or other suitable devices.

The foregoing is believed to be a full and clear description of the present invention. However, it is to be understood that certain changes as to the precise construction, combination and arrangement of parts may be resorted to that fall within the legitimate scope of the appended claims.

What is claimed is:—

1. The combination with a stable structure formed with stable rooms and feed storage rooms, of a feed elevating device, means adapted to coöperate with said elevating device and to be actuated for delivering the feed from the latter to said store rooms, said means being shiftable, automatically operated means disposed adjacent the ceilings of said store rooms adapted to distribute the feed material within said rooms, and means for rendering said distributing means effective for delivering feed material from said storage rooms to the various stable rooms when said first-mentioned means are shifted.

2. The combination with a stable structure formed with stable rooms and feed storage rooms disposed above said stable rooms and each other, of a feed elevating and lowering device, a plurality of movable grates forming the floors of said feed storage rooms, an endless conveyer disposed immediately below the grates of each storage room and being formed with a plurality of projecting fingers adapted to extend through said grates, means for raising and lowering said grates with respect to said fingers, hinged chutes adapted to be independently moved into position to coöperate with the conveyers of each storage room and said grain lifting and lowering device, a floor provided for the conveyer of the lowermost storage room and adapted to coöperate with the lower run thereof for distributing the feed material from said storage rooms to the stable rooms, and operable trap members provided in said last-mentioned floor and adapted to control the discharge of said feed material into said stable rooms.

3. The combination with a stable structure provided with stable rooms and superimposed storage rooms, of movable grate members forming the floor of said feed storage rooms, endless conveyers arranged in each room immediately beneath the grates of the superimposed rooms and adapted to coöperate with said grates for removing the feed therefrom, means coöperating with said conveyers for lowering the feed of said rooms to the lowermost endless conveyer, a flooring coöperating with the bottom run of said lowermost conveyer for distributing the feed of said storage rooms to the stable rooms, operable traps controlling the supply of feed to said stable rooms, and means for selectively controlling the supply of feed from certain of said storage rooms to the stable rooms.

In testimony whereof I have hereunto set my hand in presence of two subscribing witnesses.

ALBERT SCHUCHARDT.

Witnesses:
OSKAR HEIMANN,
OTTO HELLER.